Dec. 10, 1968  J. J. SERTICH  3,415,480
CARGO PALLET LATCH
Filed June 7, 1967
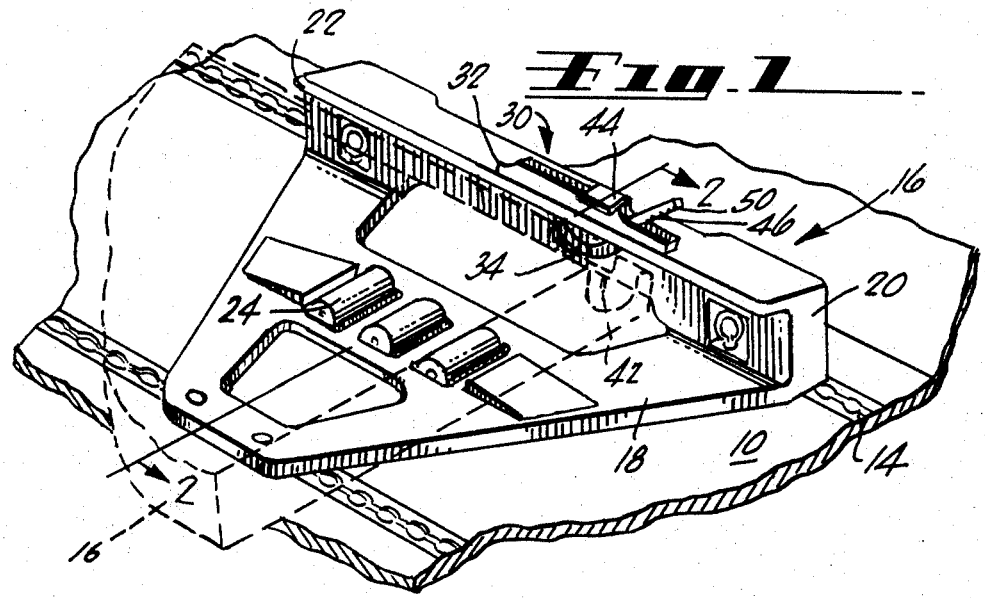
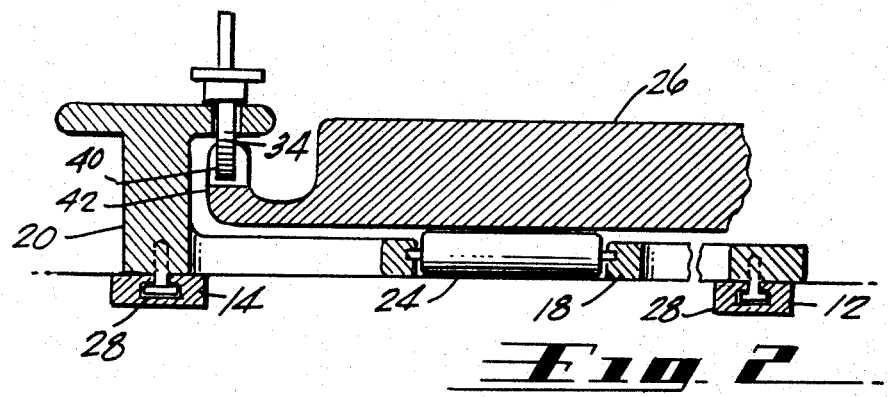
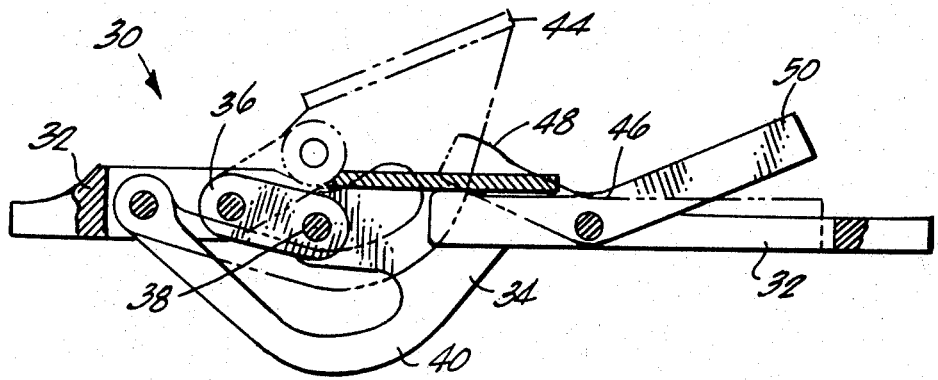
INVENTOR.
JOHN J. SERTICH
BY
Jack E. Munro
- AGENT -

United States Patent Office 3,415,480
Patented Dec. 10, 1968

3,415,480
CARGO PALLET LATCH
John J. Sertich, Wauwatosa, Wis., assignor to McDonnell Douglas Corporation, a corporation of Maryland
Filed June 7, 1967, Ser. No. 644,136
3 Claims. (Cl. 248—361)

ABSTRACT OF THE DISCLOSURE

A temporary restraining device for a cargo pallet utilizing an over-center mechanism in which one of two jointed members of the linkage is constructed of a spring material.

Background of the invention

In the transporting of cargo some type of apparatus needs to be used to support and retain the cargo during its movement. For this purpose, a load supporting surface, frequently referred to as a pallet, is quite often employed. Generally a pallet is a substantial planer surface which is employed in a horizontal manner upon which several objects of cargo are fixedly supported. The pallet is especially adapted for retaining the cargo during transportation thereof and is also designed to make movement of the loaded pallet to and from the primary transportation means as easy as possible. Usually conveyor systems which include low friction rolling devices are used to move the pallet into and out of the primary transportation means.

Common types of primary transportation means are vehicles such as trucks, railroads, ships, and planes. This invention will be discussed with respect to aircraft although its use in other trasnportation means is quite possible. In aircraft that are specifically designed for cargo, there is fixed to the aircraft floor low frictional devices such as rollers or ball casters. With the use of such low frictional devices some temporary means must be employed to hold the pallet in position during the loading and unloading operations. It is not uncommon for a loaded pallet to weight 5000 pounds and when such a pallet is moved within an aircraft fuselage, the aircraft floor will slightly tip and the pallet will proceed to move by gravity unless it is restrained.

Heretofore, many types of devices have been employed to prevent the above described roll-back. The design of each device to prevent such movement usually depends upon the design of each pallet which is employed. One common type of pallet design is the military pallet (the type of pallet used by the armed forces). The restraining device of this invention has been designed for use with the military type of pallet. However, it is considered feasible that it could be used with any type of load supporting surface. In a military pallet, the lateral edges of the pallet are formed into an upstanding lip which has formed therein a series of notches. The restraining latch of this invention is designed to cooperate with one of these notches in such a manner as to prevent the pallet from movement once it is positioned.

Summary of the invention

The latch of this invention is mounted within a pallet vertical and side restraint. The latch is so located to be coactable with the top side of the pallet and to operate in a vertical plane during the latching and unlatching movement. Specifically, the latch of this invention is constructed of two jointed members. One of the members is formed of a resilient material to establish an over-center latching action with the other jointed member. The over-center action establishes a latching position and an unlatching position for the members. The resilient member also serves the dual function of acting as the pallet holding means. The member is so designed to cooperate with a pallet notch thereby holding the pallet against movement.

Brief description of the drawing

FIGURE 1 is a pictorial view of the latch of this invention as assocaited with a pallet side and vertical restraint;

FIGURE 2 is a front sectional view of the latch taken along line 2—2 of FIGURE 1; and FIGURE 3 is a side view of the latch of this invention which clearly shows its operation.

Description of the present embodiment

Referring particularly to FIGURE 1, there is shown an aircraft floor 10 in which are mounted two spaced tracks 12 and 14. A restraining member is shown generally at 16 and includes a base 18, an upstanding edge 20 and an overhanging lip 22. Included within the base 18 are a plurality of low friction rollers 24 upon which the pallet 26 is supported. The base 18 is adjustably attached to the floor 10 by means of pins 28 which cooperate with the tracks 12 and 14. The edge of the pallet 26 is to contact the upstanding edge 20 thereby providing the horizontal restraint for the pallet. Also, the top edge of the pallet 26 is to abut the underside of the overhanging lip 22 thereby providing the vertical restraint for the pallet. It seems obvious that at least two of the members 16 are to be employed on each side of a pallet 26 to provide the necessary restraint. It is to be understood that the design of the member 16 forms no specific part of this invention. The member 16 is described to show a typical environment of the latch 30 of the invention.

The latch 30 of this invention is to be supported within the overhanging lip 22 of the member 16. Housing 32 of the latch 30 is mounted on the upper side of the lip 22. Pivotally attached within the housing 32 are links 34 and 36 which are pivotally connected together at 38. Link 34 is substantially greater in length than link 36. Link 36 is constructed as one short straight member which is made relatively nonflexible. Link 34 is not straight but substantially bowed to form an appendage 40. Also, link 34 is formed of a relatively resilient material thereby to incorporate a certain flexibility.

As shown in FIGURE 3, the links 34 and 36 are secured to the housing 32 in an in-line arrangement which is parallel to the plane of the pallet 26. This exact mounting arrangement of the links 34 and 36 is not absolutely necessary, but has been found to be most satisfactory. Links 34 and 36 are mounted so that at one point in the travel of link 36 the point of connection 38 is displaced the greatest distance from the connection of the link 34 to the housing 32. By so mounting the links 34 and 36 a binding action can be created which requires the link 34 to flex to permit movement of link 36 past this point of greatest displacement. In this manner, what is termed an "over-center" movement is achieved. It is apparent that by varying either the thickness, the width or the length of the link 34, the amount of force required to move the jointed linkage past the over-center position is also varied. Further, the variance can be achieved by the forming of the link 34 of materials of greater or lesser resiliency. The reason for the variance will be explained further in the specification.

The linkage movement results in the jointed arrangement occupying two positions of rest, each position being at or near the terminal ends of the linkage movement. The first position, which is to be termed the latched position, is when the appendage 40 extends the greatest distance from the housing 32. The second position, which is to be termed the unlatched position, is when the appendage 40 does not protrude past the plane of the overhanging lip 22. With the latch of this invention in the operative position the appendage 40 is to be within a notch 42 in the edge of the pallet 26. Therefore, if the pallet is positioned slightly inclined, the appendage 40 holds the pallet against gravitational movement. Logically, with the latch in the inoperative position, the pallet is free to move.

To facilitate the manual movement of the latch from the operative to the inoperative positions, plate 44 and lever 46 are provided. Plate 44 is connected to the link 34 and when the link 34 is in the operative position, the plate 44 rests on the top surface of the housing 32. The lever 46 is pivotally connected to the housing 32 so end 48 thereof comes in contact with the underside of plate 44. With the latch in the operative position (plate 44 in contact with housing 32), it is only necessary to apply a sufficient manual downward force to end 50 of lever 46 to move the latch to the inoperative position. With the latch in the inoperative position a sufficient manual downward force (as by a human foot) applied to plate 44 will move the latch to the opertaive position.

In any particular installation, the use of a maximum weight pallet might be contemplated. For instance, the loaded pallet weight may never exceed 2,000 pounds, or in another instance 5,000 pounds. The latch of this invention can be specifically designed for the maximum pallet load. As previously described the resiliency of the link 34 can be varied for the purpose of varying the restraining force of the latch. Thereby, the latch of this invention can be designed to hold a pallet of a specific maximum loaded weight eliminating any "waste" which would occur if the latch were made for a greater maximum weight pallet.

I claim:
1. In combination with a cargo handling system in which a cargo pallet is employed, a latch for temporarily restraining the pallet comprising:
   a housing;
   a first link pivotally connected to said housing;
   a second link pivotally connected to said housing, the free ends of said first and second links being pivotally connected together, said second link being of a greater length and a greater resilience than said first link, whereby an over-center latching action is achieved during the movement of said links; and
   holding means connected to said second link which is to contact said pallet and prevent movement of the pallet.
2. An invention as described in claim 1 wherein:
   said holding means is a portion of the longitudinal length of said second link.
3. An invention as described in claim 1 where:
   means being operatively associated with said first and second links to facilitate manual latching and unlatching of said links.

References Cited

UNITED STATES PATENTS 3,182,608   5/1965   Mollon _____ 105—366
3,210,038   10/1965  Bader et al. _____ 248—361

ALBERT J. MAKEY, *Primary Examiner.*

U.S. Cl. X.R.

214—84; 105—369; 24—270